(12) United States Patent
Dauphinee et al.

(10) Patent No.: US 7,362,384 B2
(45) Date of Patent: Apr. 22, 2008

(54) APPARATUS AND METHOD FOR FEED-FORWARD IMAGE REJECTION IN A DUAL CONVERSION RECEIVER

(75) Inventors: Leonard Dauphinee, Irvine, CA (US); Lawrence M. Burns, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 661 days.

(21) Appl. No.: 10/812,949

(22) Filed: Mar. 31, 2004

(65) Prior Publication Data

US 2005/0191984 A1 Sep. 1, 2005

Related U.S. Application Data

(60) Provisional application No. 60/547,764, filed on Feb. 26, 2004.

(51) Int. Cl.
*H04N 5/50* (2006.01)

(52) U.S. Cl. .................. 348/725; 348/731; 348/607; 348/909; 455/285

(58) Field of Classification Search ............... 348/725, 348/731, 607, 909; 455/285, 115, 63.1, 78, 455/82, 570, 296, 304–308, 319, 326; 725/139, 725/151

See application file for complete search history.

(56) References Cited

U.S. PATENT DOCUMENTS

| | | | |
|---|---|---|---|
| 4,340,975 A | 7/1982 | Onishi et al. | |
| 5,108,334 A | 4/1992 | Eschenbach et al. | |
| 5,200,826 A | 4/1993 | Seong | |
| 5,737,035 A | 4/1998 | Rotzoll | |
| 5,847,612 A | 12/1998 | Birleson | |
| 5,930,696 A | 7/1999 | Tzuang et al. | |
| 5,940,143 A | 8/1999 | Igarashi et al. | |
| 6,009,317 A | 12/1999 | Wynn | |
| 6,160,572 A | 12/2000 | Matsuura | |
| 6,163,684 A | 12/2000 | Birleson | |
| 6,177,964 B1 * | 1/2001 | Birleson et al. | 348/725 |

(Continued)

OTHER PUBLICATIONS

Search Report from European Patent Appl. No. 05002613.7, 3 pages, dated Jun. 6, 2006.

*Primary Examiner*—Trang U. Tran
(74) *Attorney, Agent, or Firm*—Sterne, Kessler, Goldstein & Fox P.L.L.C.

(57) ABSTRACT

A receiver portion includes a bandpass filter (e.g. SAW filter) that performs channel selection from an input signal having a plurality of channels, and an image cancellation circuit that is in parallel with the bandpass filter. The bandpass filter performs channel selection to select a desired channel that falls in a passband of the bandpass filter. Since the passband is typically a few channels wide, the image channel falls outside the passband and is attenuated by the stopband attenuation of the bandpass filter. The image cancellation circuit includes an attenuator and a phase shifter. The attenuator is configured to have the same attenuation as the stopband attenuation of the bandpass filter at the image channel frequency, and phase shifter is configured to provide a phase shift of approximately 180 degrees. Therefore, the image cancellation circuit has an output that is equal in amplitude, but opposite in phase, to that of the bandpass filter at the image channel frequency. A summer combines the output of the image cancellation circuit with the bandpass filter output to further suppress the image channel frequency over that achieved by the bandpass filter alone.

26 Claims, 14 Drawing Sheets

U.S. PATENT DOCUMENTS

| | | |
|---|---|---|
| 6,484,042 B1 | 11/2002 | Loke |
| 6,792,250 B1 * | 9/2004 | Zarubin .................. 455/115.1 |
| 7,065,337 B2 * | 6/2006 | Cowley et al. ............. 455/266 |
| 7,158,192 B2 * | 1/2007 | Kunishima ................. 348/737 |
| 7,180,553 B2 * | 2/2007 | Su ............................. 348/731 |
| 7,184,724 B1 * | 2/2007 | Ashby et al. ............... 455/130 |
| 2007/0126937 A1 * | 6/2007 | Utsunomiya et al. ....... 348/731 |

* cited by examiner

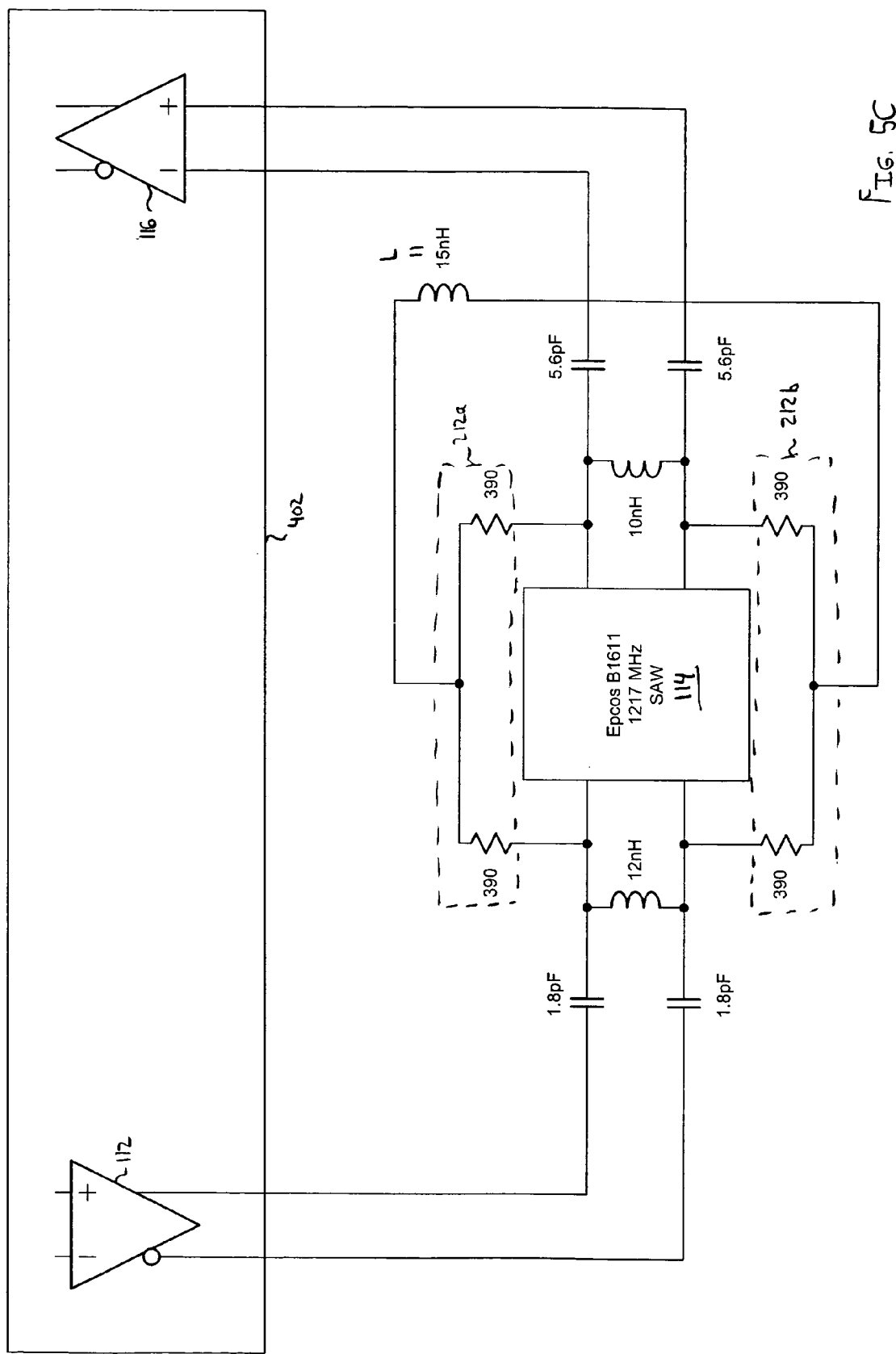

*Response without feed-forward elements*

*Response with feed-forward elements*

900(cont')
↓

914 — Mix the first IF signal having the suppressed image channel with a second local oscillator signal so as to generate a second IF signal 916 — Filter the second IF signal so as to pass the desired channel at the second IF and remove any unwanted frequency

FIG. 9B

APPARATUS AND METHOD FOR FEED-FORWARD IMAGE REJECTION IN A DUAL CONVERSION RECEIVER

This application claims the benefit of U.S. Provisional Application No. 60/547,764, filed on Feb. 26, 2004, which is incorporated herein by reference.

BACKGROUND OF THE INVENTION

1. Field of the Invention

The present invention generally relates to image rejection in a dual conversion receiver, and more specifically to improving image rejection using a feed-forward network that cancels the image frequency at the output of a channel selection filter.

2. Background Art

Television signals are transmitted at radio frequencies (RF) using terrestrial, cable, or satellite transmission schemes. Terrestrial and cable TV signals are typically transmitted at frequencies of approximately 57 to 860 MHZ, with 6 MHZ channel spacings in the United States and 8 MHz channel spacing in Europe. Satellite TV signals are typically transmitted at frequencies of approximately 980 to 2180 MHz.

Regardless of the transmission scheme, a tuner is utilized to select and down-convert a desired channel from the TV signal to an intermediate frequency (IF) signal or a baseband signal, which is suitable for processing and display on a TV or computer screen. The tuner should provide sufficient image rejection and channel selection during down-conversion as is necessary for the specific application. The National Television Standards Committee (NTSC) sets standards for television signal transmission, reception, and display. To process a NTSC signal, it is preferable that the tuner have a high-level of image rejection. However, less image rejection is acceptable for non-NTSC signals depending on the specific application and the corresponding display requirements.

To achieve a high level of image rejection, traditional TV tuners utilize a dual-conversion architecture having two mixers and at least one surface acoustic wave (SAW) filter. The first mixer up-converts the received RF signal to a first IF frequency (e.g. 1220 MHZ) that is fixed above the RF signal band of the incoming TV signal, using a variable local oscillator (LO) signal. A SAW filter, centered at the first IF, selects the channel of interest and provides the image rejection to prevent signal interference. The second mixer then down-converts the first IF to a lower frequency second IF, using a second fixed frequency LO signal. The second IF output is at baseband for a NTSC compatible signal. Alternatively, the second IF is at 36 or 44 MHZ for a cable system applications, such as for further processing in a set top box or a cable modem. Channel selection is realized by adjusting the first LO signal so that the desired channel is up-converted into the passband of the SAW filter, and is then down-converted to baseband by the second mixer and its second LO.

When the tuner is configured to output the desired channel at second IF (e.g. 36 MHz or 44 MHz for cable), an image channel or frequency is also down-converted to the second IF that interferes with the desired channel. For standard TV channels, the second IF is located at the $IF_1 - 2 \cdot IF_2$. For example, for an $IF_1 = 1220$ MHz and a $IF_2$ at 44 MHz, then the image channel will be located at 1132 MHz. Conventional SAW filters attenuate the image channel by approximately 45-50 dB. However, NTSC standards require from 60-65 dBc of image rejection to avoid degradation, whereas cable modems can live with 50-55 dBc of image rejection to avoid degradation.

One conventional technique to reduce the amplitude of the image channel, and the resulting interference, is to use an image reject mixer for the second stage mixer. However, image reject mixers utilize two component mixers in an IQ configuration and therefore require increased local oscillator drive and twice the power consumption when compared to single mixer configurations.

A second technique is to implement a narrowband notch filter at the input or output of SAW filter that is intended to reject only the image frequency (e.g. 1132 MHz). Single frequency notch filters, however, are extremely difficult to build and their accuracy can vary with the input or output impedance of the SAW filter.

What is needed is a method or apparatus for improving image rejection in a dual conversion receiver that does not require image reject mixers or conventional notch filters.

BRIEF SUMMARY OF THE INVENTION

The present invention is an apparatus and method for image channel suppression in a receiver circuit. The image channel in a receiver is an unwanted channel that can interfere with the down-conversion and reception of a desired channel.

A receiver portion, according to embodiments of the present invention, includes a bandpass filter (e.g. SAW filter) that performs channel selection from an input signal having a plurality of channels, and an image cancellation circuit that is in parallel with the bandpass filter. The bandpass filter performs channel selection to select a desired channel that falls in a passband of the bandpass filter. Since the passband is typically a few channels wide, the image channel will fall outside the passband and be attenuated by the stopband attenuation of the bandpass filter.

The image cancellation circuit includes an attenuator and a phase shifter. The attenuator is configured to have the same attenuation as the stopband attenuation of the bandpass filter at the image channel frequency, and the phase shifter is configured to provide a phase shift of approximately 180 degrees. Therefore, the image cancellation circuit has an output that is equal in amplitude, but opposite in phase, to that of the bandpass filter at the image channel frequency. A summer combines the output of the image cancellation circuit with the bandpass filter output to further suppress the image channel frequency over that achieved by the bandpass filter alone.

In embodiments, the image cancellation circuit can be an off-chip passive circuit network including resistors, capacitors, and/or inductors that are configured to provide the necessary attenuation and phase shift to cancel the image channel at the output of the bandpass filter. Since the bandpass filter is often an off-chip SAW filter, the off-chip network can be integrated with the off-chip SAW filter.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 5A-5C and 6 illustrate network circuit embodiments of the image cancellation circuit.

FIGS. 9A and 9B illustrate a flowchart that further describes the feed forward image rejection in the dual conversion tuner assembly, according to embodiments of the present invention.

DETAILED DESCRIPTION OF THE INVENTION

Figure 1A:
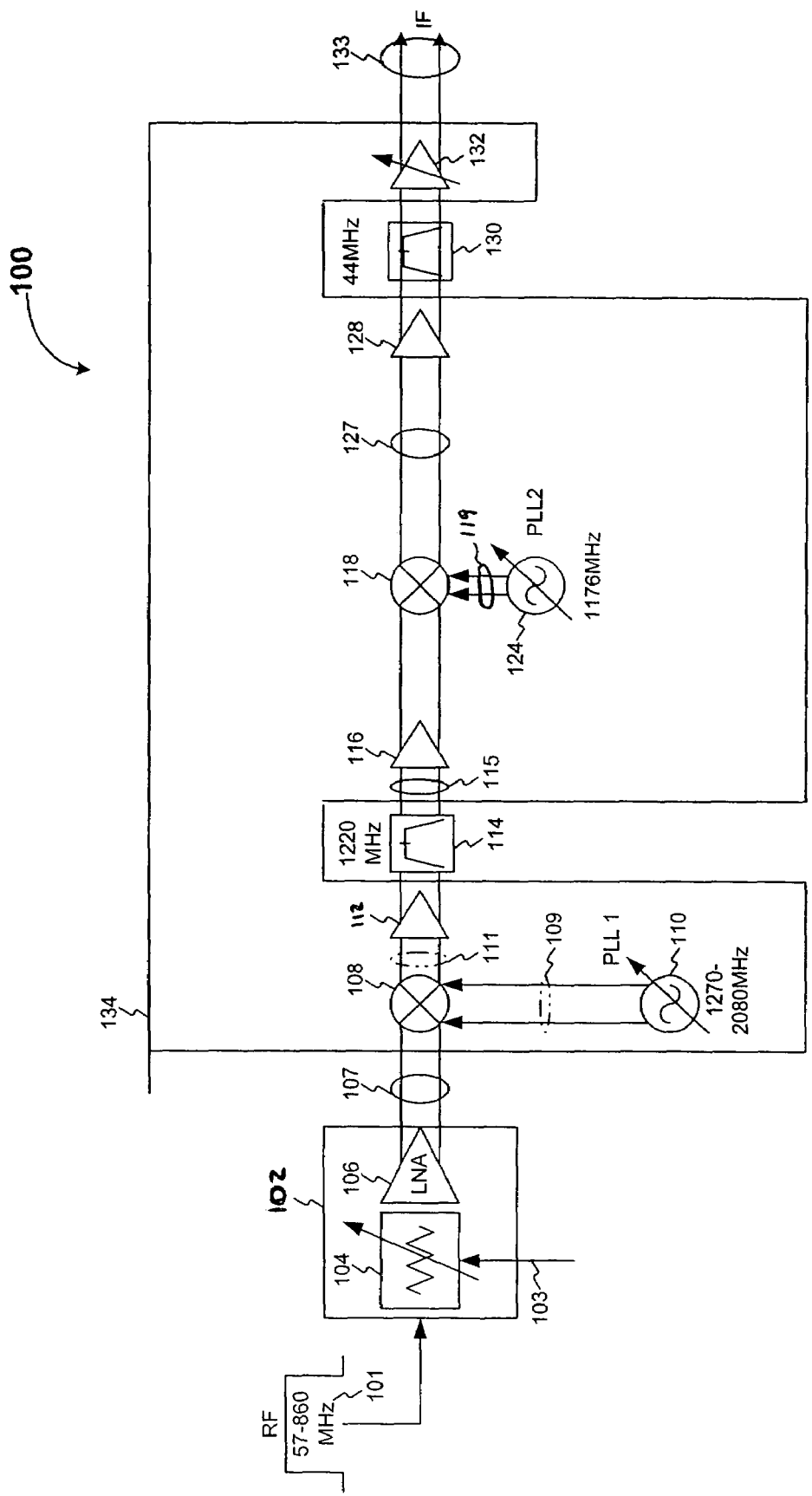
FIG. 1A illustrates a dual conversion tuner.

FIG. 1A illustrates a schematic of a tuner assembly 100 that has an automatic gain control circuit (AGC) 102 and a tuner 134.

The tuner assembly 100 receives an RF input signal 101 having multiple channels and down-converts a selected channel to an IF frequency, to produce an IF signal 133. For instance, the RF input signal 101 can include multiple TV channels that typically have 6 MHZ frequency spacings and cover a range of 54-860 MHZ, and where the selected channel is down-converted to an IF frequency at 44 MHZ, 36 MHZ or some other desired IF frequency for further processing. The frequencies listed herein are not meant as a limitation and are provided for example purposes only. The structure and operation of the tuner assembly 100 are described in further detail below.

The AGC circuit 102 provides automatic gain control using a variable resistor 104 and a low noise amplifier (LNA) 106. The variable resistor 104 attenuates the RF input signal 101 according to a control signal 103. In embodiments, the control signal 103 is based on the signal amplitude of the IF signal 133 so that the RF front-end gain can be adjusted to achieve a desired amplitude for the IF signal 133. The LNA 106 provides low noise amplification and converts a single-ended input signal to a differential RF signal 107.

The tuner 134 has a dual conversion architecture (one up-conversion, and one down-conversion) that includes an up-convert mixer 108 and a down-convert mixer 118. The up-convert mixer 108 is driven by a first phase locked loop (PLL) 110 that has coarse tuning capability from 1270-2080 MHz. The down-convert mixer 118 is driven by a second PLL 124 that has a relatively fixed frequency of 1176 MHZ (for a 44 MHZ IF) and has fine frequency tuning capability. Two separate off-chip surface acoustic wave (SAW) filters 114 and 130 are used to perform IF filtering in the tuner 134. However, other bandpass filters besides SAW filters could be used for the filters 114 and 130 as will be understood by those skilled in the arts. The first SAW filter 114 is connected between the up-convert mixer 108 and the down-convert mixer 118. The passband of the SAW filter 114 is centered at 1220 MHZ, and is preferably only a few channels wide (e.g. 1-2 channels wide or 12 MHZ for 6 MHZ TV channel spacings), and can be referred to as a channel selection filter. The second SAW filter 130 has a passband at 44 MHZ and is coupled to the output of the amplifier 128. Additionally, various on-chip amplifiers 112, 116, 128, and 132 are included throughout the tuner 134 to provide signal amplification, as necessary. These various amplifiers may have fixed gain, or may be variable in gain. In some cases, the variable gain amplifiers can be part of independent, self-leveling AGC circuits.

Figure 1B:
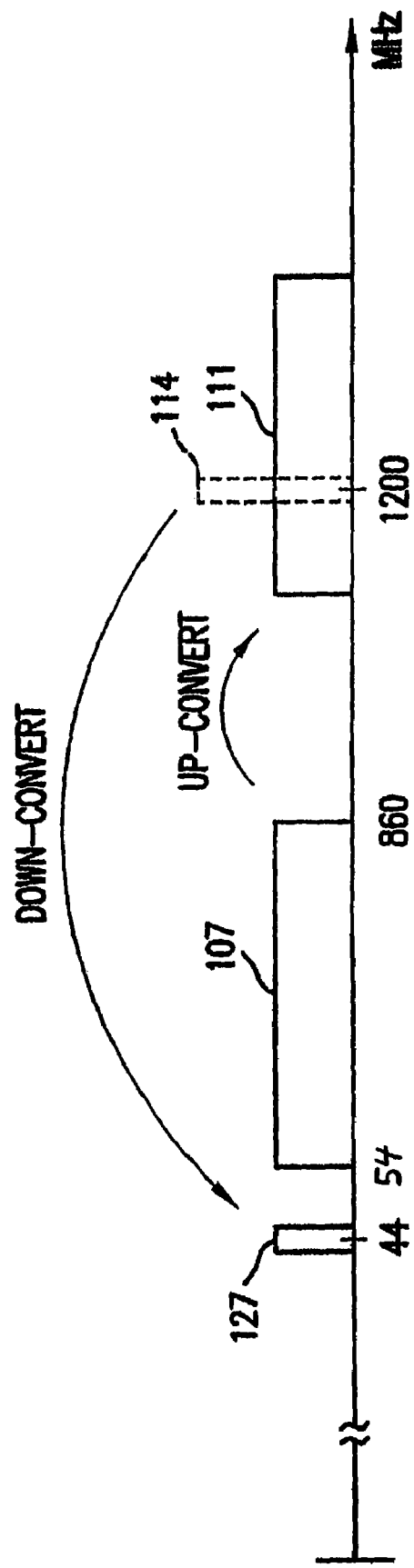
FIG. 1B illustrates the channel selection of the dual conversion tuner.

The operation of the tuner 134 is described as follows and in reference to FIG. 1B, where FIG. 1B represents the frequency spectrum of the particular signals that are operated on and generated by the tuner 134. The up-convert mixer 108 mixes the RF signal 107 with a LO signal 109 that is generated by the PLL 110. As discussed above and as shown in FIG. 1B, the RF signal 107 can be a TV signal having a plurality of channels that occupy from 54 MHz to 860 MHz. Since the PLL 110 is tunable from 1270 to 2080 MHZ, the RF signal 107 is up-converted to a first IF 111 having a frequency that is above the 54-860 MHZ input frequency band. The first IF 111 is sent off-chip to the SAW filter 114, which has a narrow passband window centered at 1220 MHz, as discussed above. The first SAW filter 114 selects a desired channel 115 that is within its narrow passband window, and substantially rejects all of the remaining channels, including an image channel or frequency. Therefore, a particular channel is selected by varying the frequency of the LO signal 109 so that the desired channel is up-converted into the narrow passband of the IF filter 114. The desired channel 115 (at 1220 MHZ) is sent back on-chip to the VGA 116, where the PGA 116 provides gain for the selected channel 115. The down-convert mixer 118 mixes the output of the VGA 116 with an LO signal from the PLL 124. The down-convert mixer 118 down-converts the desired channel 115 to an 44 MHZ IF signal 127 that appears at the IF output of the down-convert mixer 118. Finally, the IF signal 127 is filtered a second time by the bandpass SAW filter 130 to reject any unwanted frequency harmonics and other spurious products that are not in the passband, producing the output IF signal 133 at 44 MHZ, or some other desired IF frequency or baseband, and carrying the information in the desired channel.

The specific frequencies mentioned in the description of the tuner assembly 100, and throughout this application, are given for example purposes only and are not meant to be limiting. Those skilled in the arts will recognize other frequency applications for the tuner assembly 100 based on the discussion given herein. These other frequency applications are within the scope and spirit of the present invention.

Furthermore, it is noted that the tuner 100 is configured for differential operation. For instance, the first mixer 108, the bandpass filter 114, the second mixer 118, the first LO signal 109, and the second LO signal 119 are all configured with differential inputs and outputs to reduce signal distortion. However, the present invention is not limited to differential operation, and can be implemented in single ended configurations.

Figure 1C:
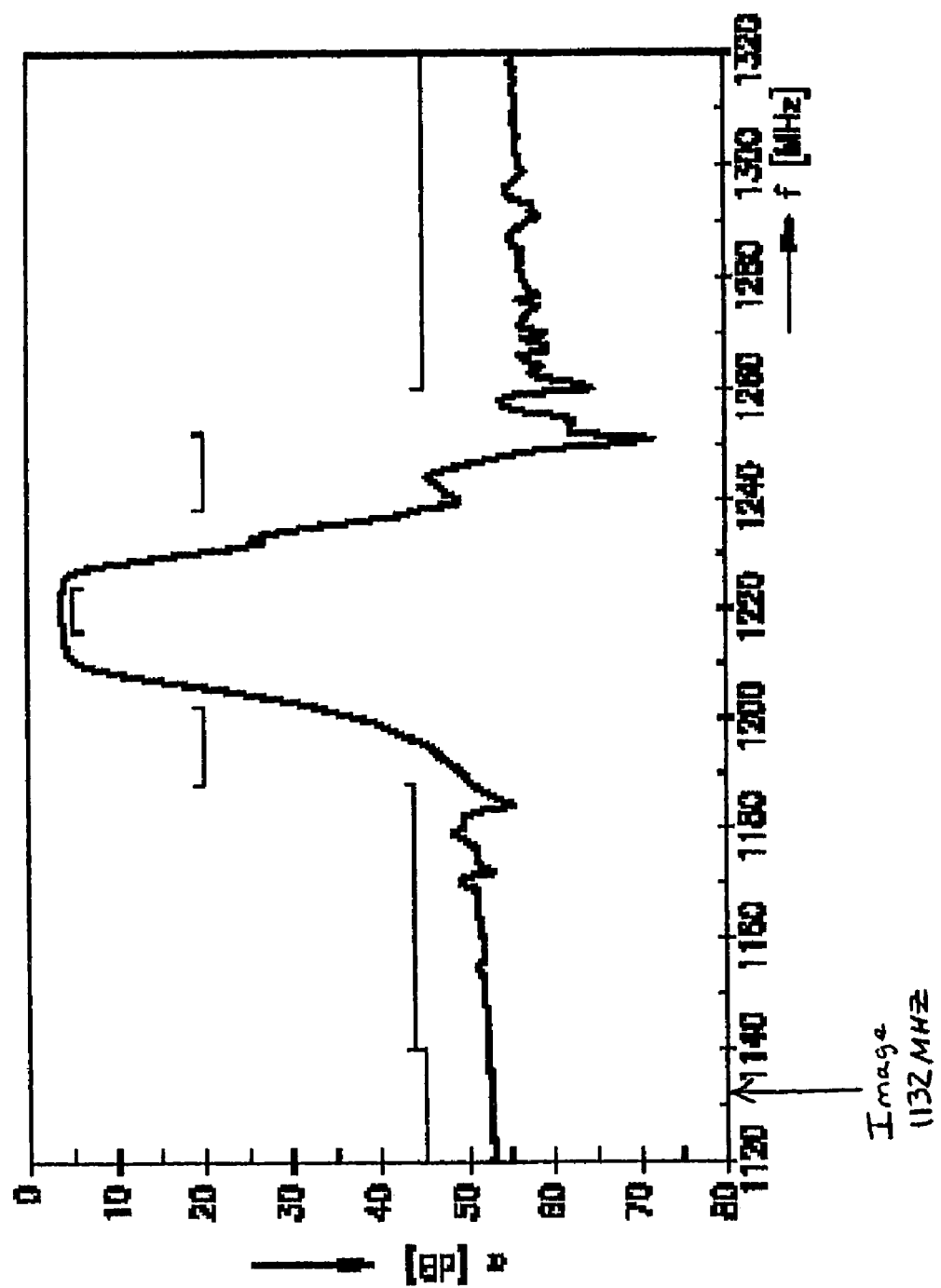
FIG. 1C illustrates the passband and nearby stopbands of a SAW filter in a dual conversion tuner.

As discussed above, the SAW filter 114 provides channel selection, including image channel rejection for images that fall outside the passband of the SAW filter. However, the stopband rejection of the SAW filter is not infinite and therefore energy from undesirable channels, including the image channel, can pass through the SAW filter. For example, FIG. 1C illustrates the frequency response of a conventional SAW filter 114. From FIG. 1C, it can be seen the rejection is approximately 45-50 dB at the image frequency of 1132 Mhz ($IF_1$-$2 \cdot IF_2$). In certain applications, more rejection is desired. For example, NTSC and cable modem applications require greater than 50 dB of rejection.

Figure 2B:
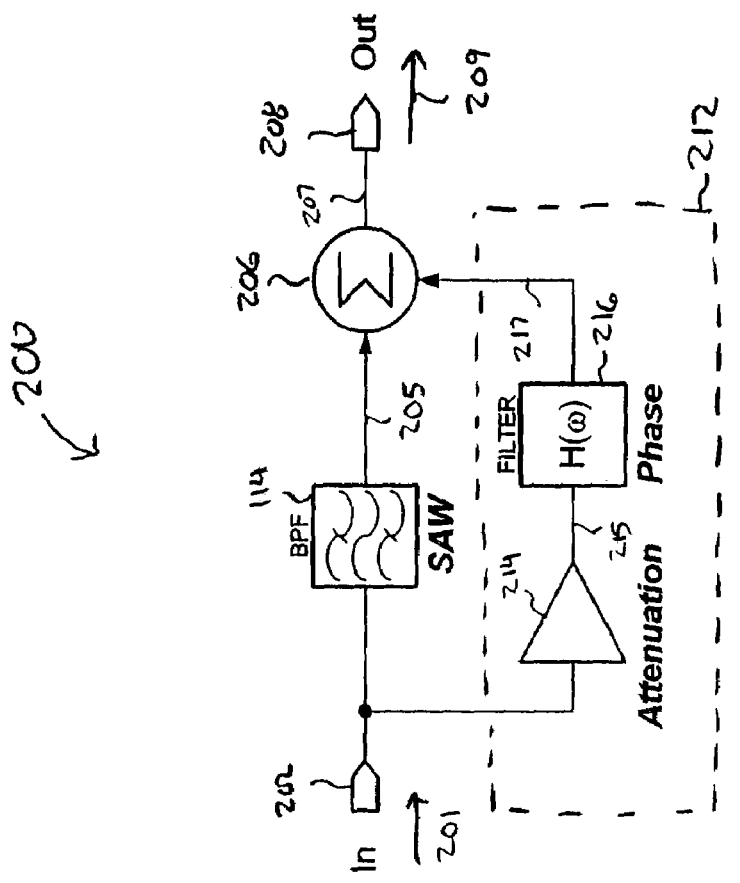
FIGS. 2A and 2B illustrates a receiver portion that has feed forward image rejection according to embodiments of the present invention.
Figure 2A:
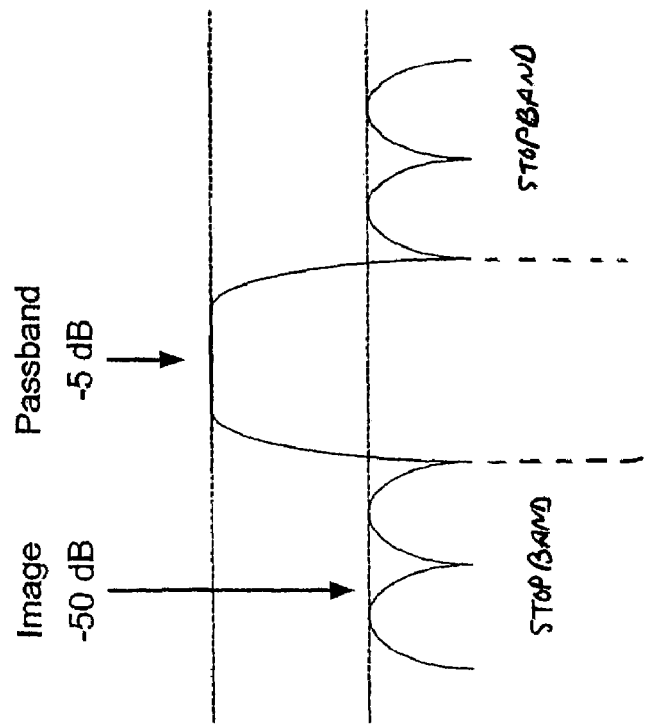

FIGS. 2A and 2B illustrates a receiver portion 200 that has feed forward image rejection according to embodiments of the present invention. The receiver portion 200 can replace the SAW filter 114 in the tuner assembly 100. The receiver portion 200 includes the SAW filter 114 (or another type of bandpass filter), a feed forward image cancellation circuit 212 that is configured in parallel with the SAW filter 114, and a summer 206. As discussed below, the feed forward image cancellation circuit 212 improves image rejection over the image rejection of the SAW filter alone.

Receiver portion 200 receives an input signal 201 that has a desired channel and an image channel. The response of the SAW filter 114 is shown in FIG. 2A to have a passband attenuation of approximately 5 dB and a stopband attenuation of approximately 50 dB. These attenuation levels are provided merely for example purposes and are not meant to be limiting.

The image cancellation circuit 212 includes an attenuator 214 and a phase shifter/filter 216. The attenuator 214 has an attenuation level set approximately to that of the stopband attention of the SAW filter 114. More specifically, the attenuator 214 has an attenuation level approximately set to the attenuation that is provided by the SAW filter 114 at the image channel frequency, which is approximately 50 dB for the example shown in FIG. 2A. The phase shifter 216 is configured to pass the image frequency and have a phase shift of approximately 180 degrees at the image channel frequency. The summer 206 sums the output of the phase shifter 216 with the output of the SAW filter 114.

During operation, the feed forward image cancellation circuit 212 attenuates the image channel and then phase shifts the image channel so as to cancel the image channel in the summer 206. More specifically, the attenuator 214 generates an attenuated signal 215 that is attenuated by approximately the same amount as the image channel in the signal 205 at the output of the SAW filter 114. The phase shifter then shifts the phase of the attenuated signal 215 by approximately 180 degrees at the image channel frequency, to produce a phase shifted signal 217. The phase shifted signal 217 has an amplitude at the image frequency that substantially matches the amplitude of the image channel in the signal 205, but is approximately 180 degrees out-of-phase with the image channel in the signal 205. Accordingly, when combined in the summer 206, the amplitude of the image channel in the resulting signal 207 is further reduced relative to that the output of the SAW filter 114.

It is noted that the signal 217 from the image cancellation circuit 212 also contains signals at the same frequency as the passband, but attenuated by 45-50 dB, and at approximately 180 degrees in phase. Such signals do add to the already present passband signals at the output of the SAW filter 114 (that have only been attenuated by 5 dB). The addition of these two signals, out-of-phase, with more than 45 dB difference in amplitude causes an imperceptible amount of ripple in the resultant passband.

In one embodiment, the phase shifter 216 also provides filtering so as to substantially pass only the image channel. However, the image channel selectivity in the feed forward circuit 212 is not critical because of the attenuation introduced by the attenuator 214.

Figure 3:
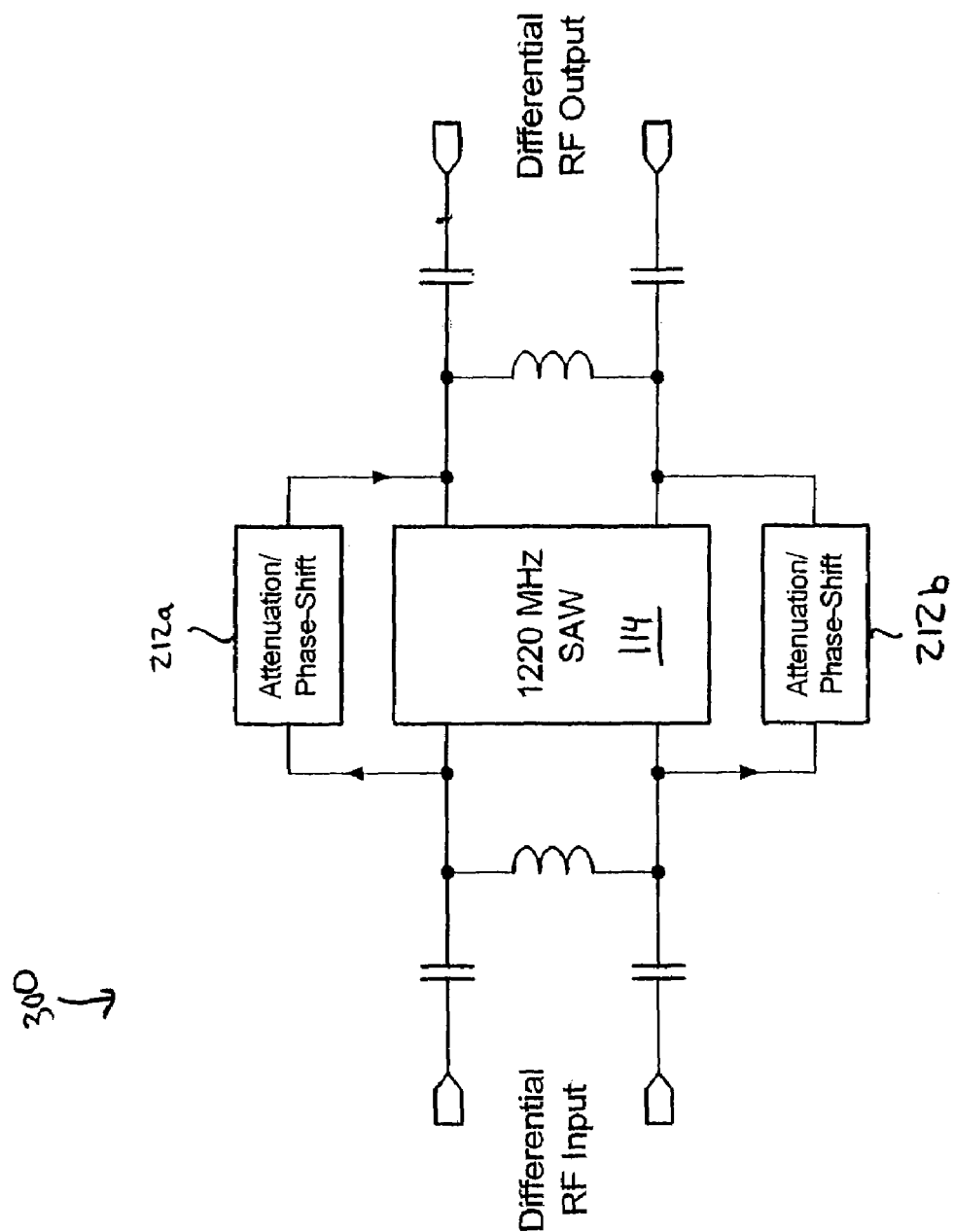
FIG. 3 illustrates a differential configuration of the feed forward circuit, according to embodiments of the present invention.

FIG. 3 illustrates a differential configuration 300 of the feed forward circuit, including first and second feed forward image cancellation circuits 212a and 212b. Although two separate attenuation/phase-shift elements are shown in FIG. 3, some embodiments may combine these two elements into a single unit, with effective interaction between the two sides.

Figure 4:
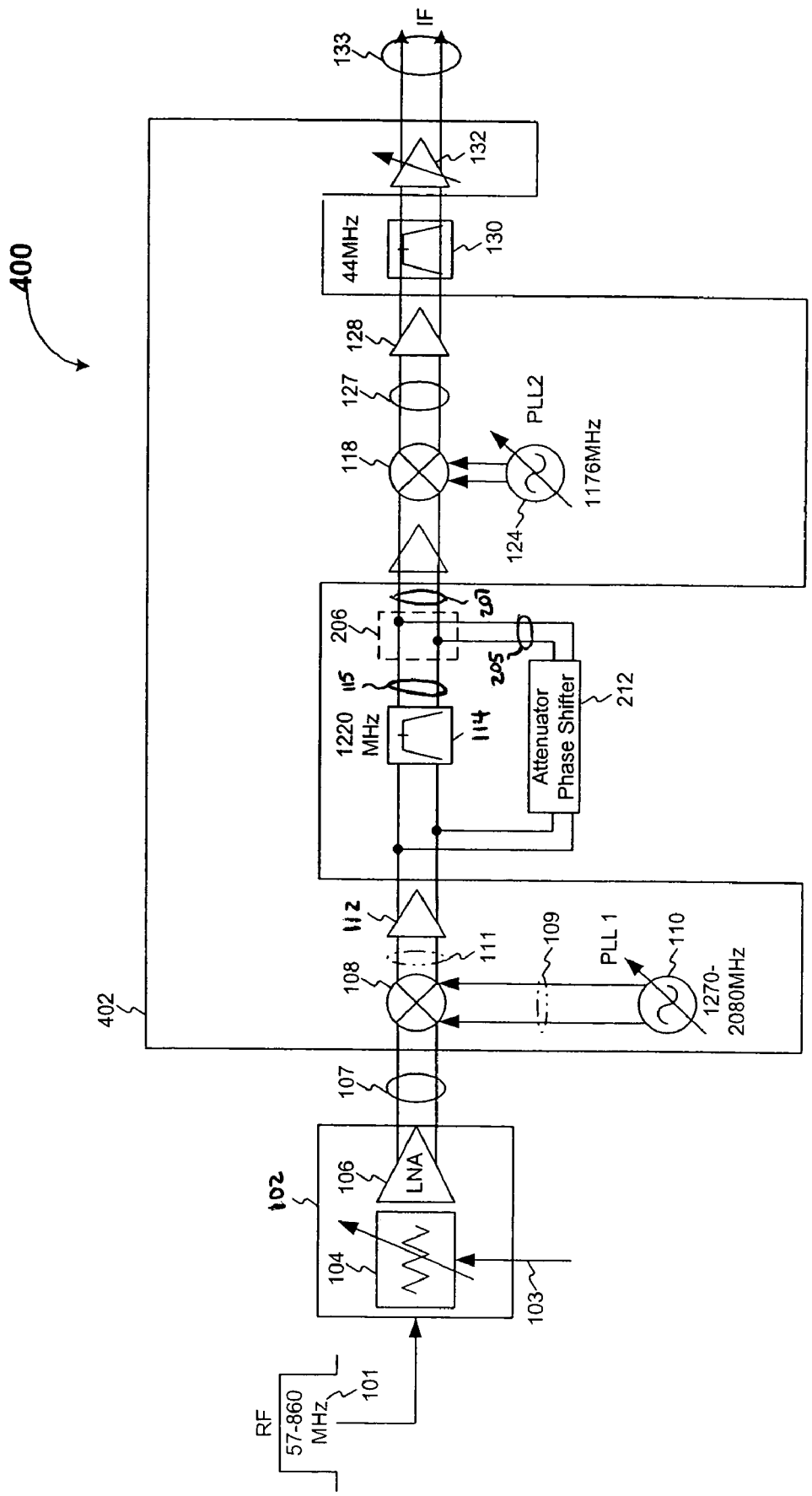
FIG. 4 illustrates a tuner assembly having a feed forward image cancellation circuit that is configured in parallel with a SAW filter, according to embodiments of the present invention.

FIG. 4 illustrates a tuner assembly 400 having the feed forward image cancellation circuit 212 that is configured in parallel with the SAW filter 114. As discussed above with reference to FIG. 1, the image channel frequency in a dual conversion tuner and the image frequency of the second mixer occurs at $IF_1$-$2 \cdot IF_2$, which occurs at 1132 MHz for an exemplary $IF_1$=1220 MHz, and an $IF_2$=44 MHz. Therefore, the attenuation level for the feed forward image cancellation circuit 212 should be set to the signal amplitude at the output of the SAW filter 114 at the image channel frequency, e.g. 1132 MHz frequency.

Figure 8B:
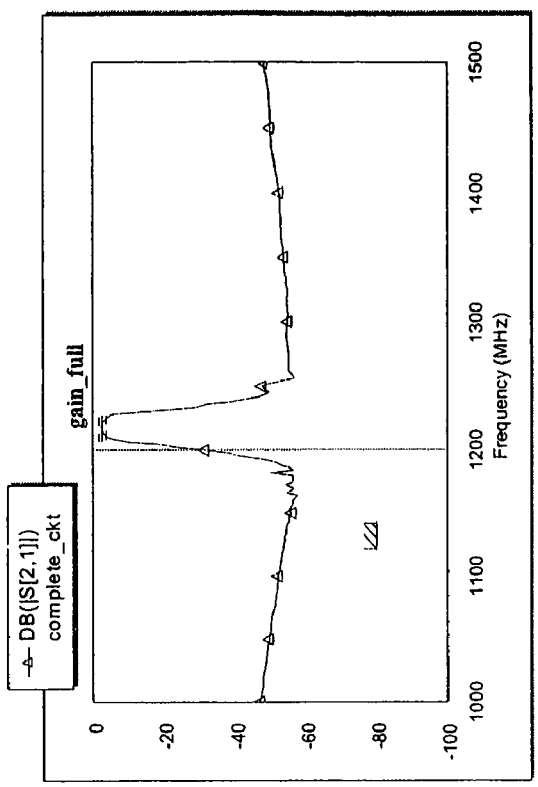
FIGS. 8A and 8B compare the output response of the dual conversion tuner assembly with the feed-forward image rejection (FIG. 8A) verses without the feed forward image rejection (FIG. 8B).
Figure 8A:
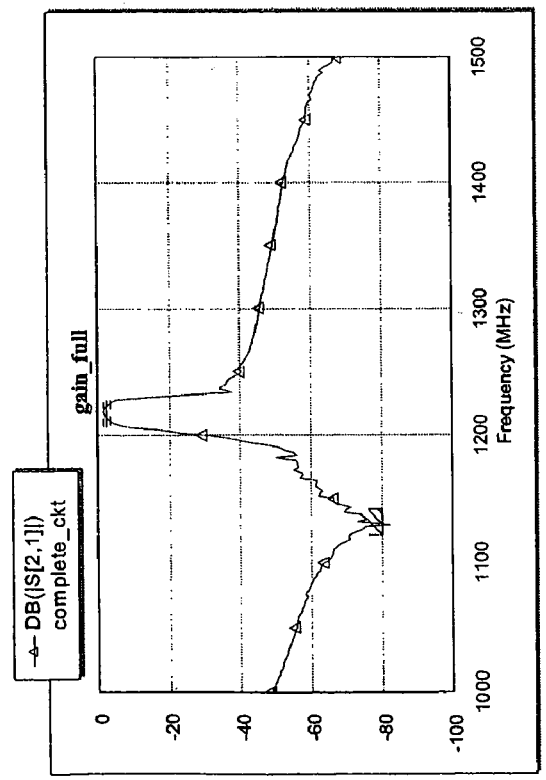

FIGS. 8A and 8B compare the output response of the dual conversion tuner assembly 400 with the feed-forward image rejection (FIG. 8A) verses without the feed forward image rejection (FIG. 8B). As shown in FIG. 8A, approximately 80 dB of image rejection is achieved using the feed forward circuit in simulations, whereas only 55 dB of image rejection is achieved with the SAW filter alone.

Figure 5A:
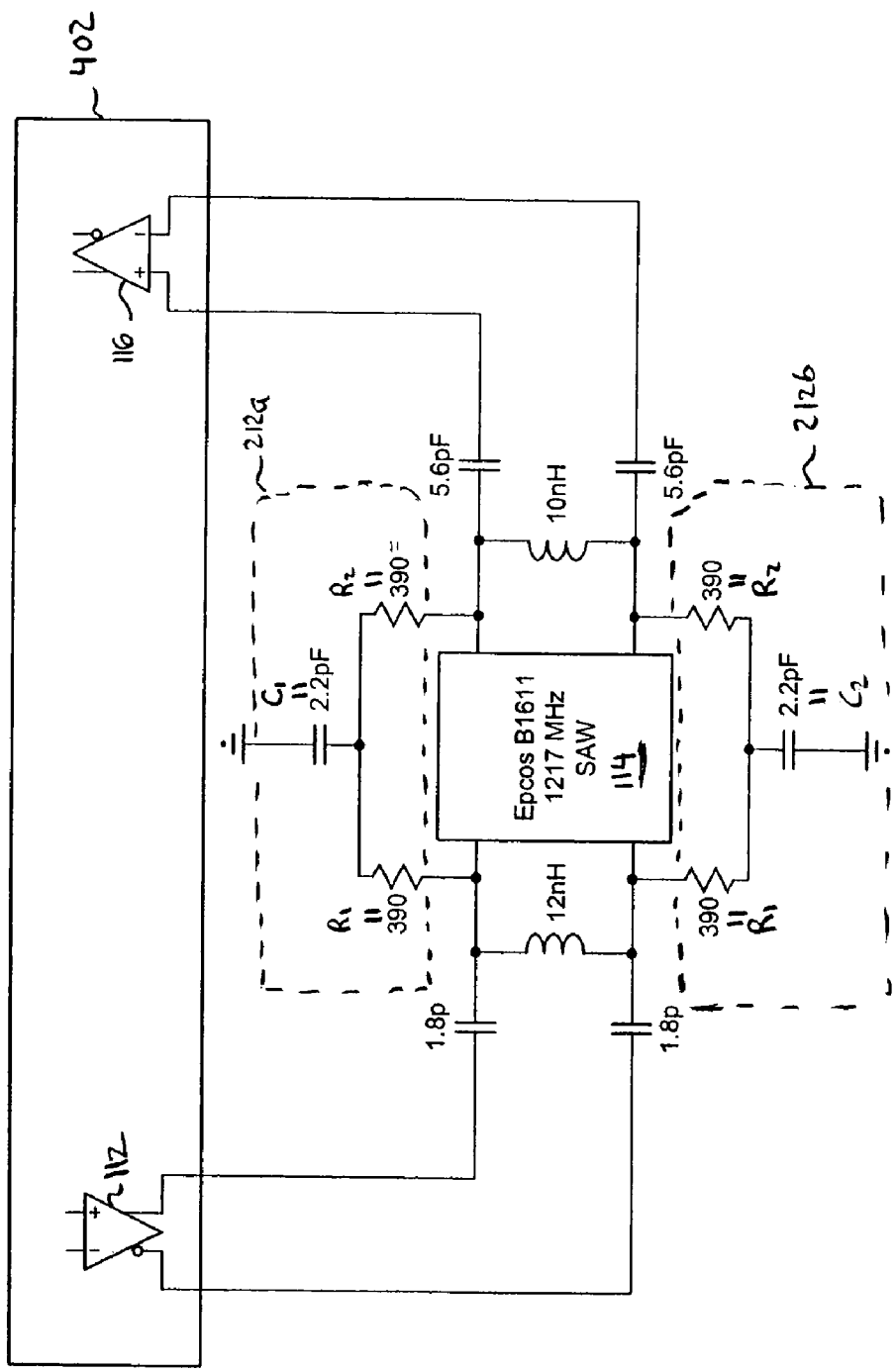

FIG. 5A illustrates one embodiment of the feed forward image cancellation circuits 212a and 212b. Each image cancellation circuit 212 in FIG. 5A includes a first resistor $R_1$, a second resistor $R_2$, and a capacitor $C_1$.

In one embodiment, the combination of resistors and a single capacitor will not provide the 180 degrees of phase shift (instead maybe only 90 degrees). However, the SAW filter 114 has a lot of phase shift itself, so that less than 180 degrees of phase shift can be tolerated from the image cancellation circuit.

Figure 5B:
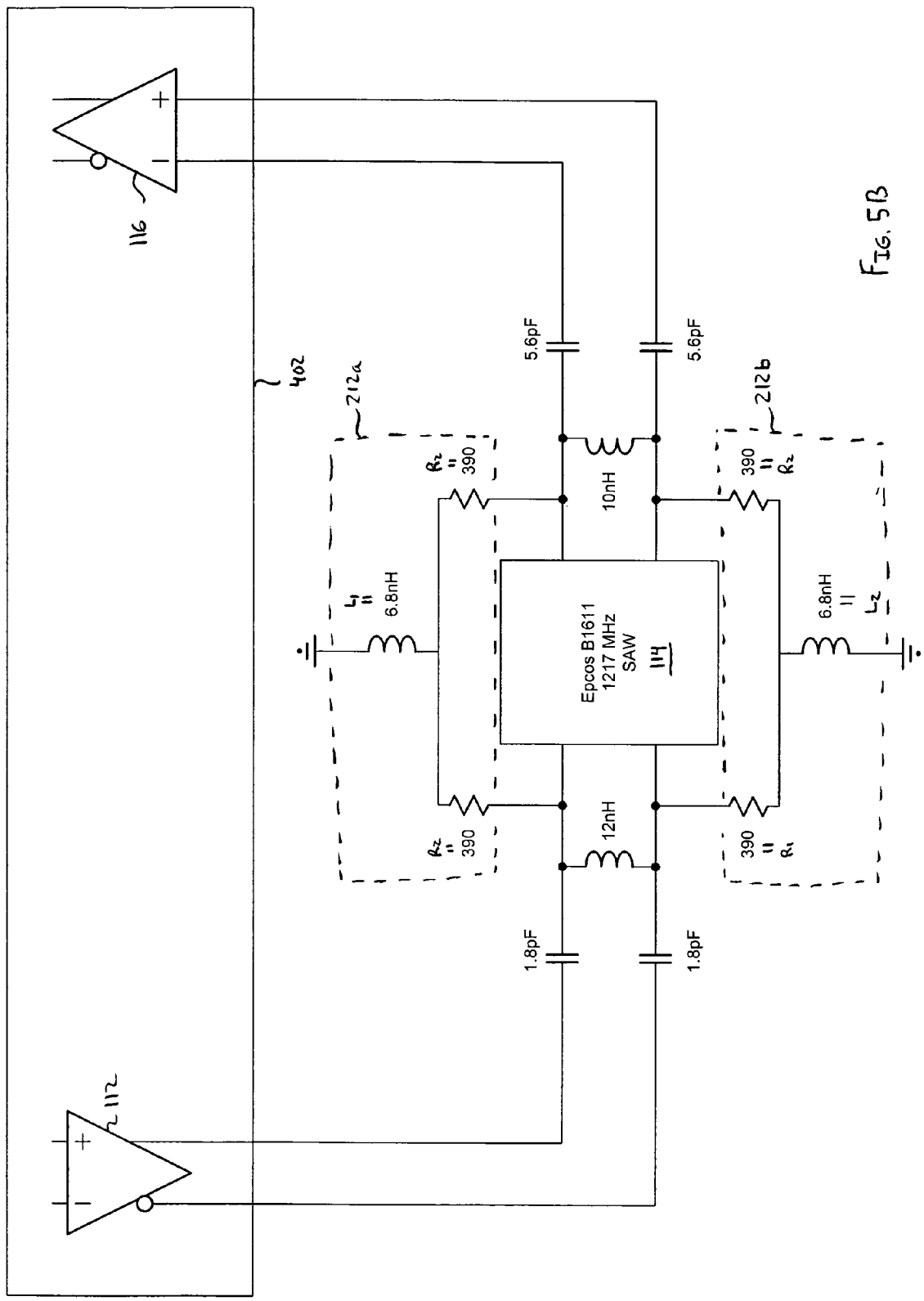

FIG. 5B illustrates a second embodiment of the feed forward image cancellation circuits 212a and 212b. This embodiment replaces the capacitors C1 and C2 in FIG. 5A with inductors L1 and L2. This embodiment may be necessary for a given SAW filter phase response to produce the desired image cancellation.

FIG. 5C illustrates a third embodiment of the feed forward image cancellation circuits 212a and 212b. A single differential inductor L is employed instead of two shunted inductors. A similar embodiment may be employed with the shunted capacitors of FIG. 5A.

Figure 6:
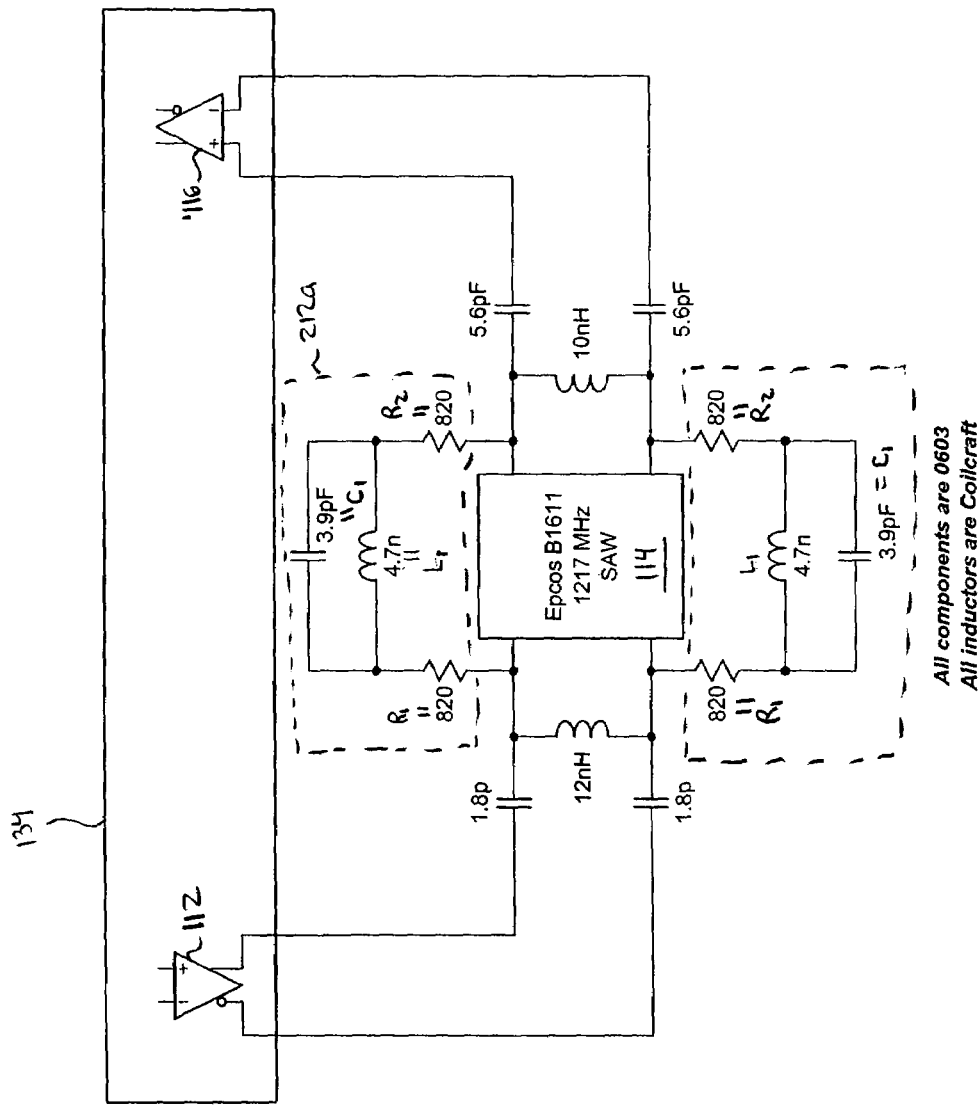

FIG. 6 illustrates a fourth embodiment of the tuner 400 having the feed forward image cancellation circuits 212a and 212b. In FIG. 6, each image cancellation circuit 212 includes a first resistor $R_1$, a second resistor $R_2$, a capacitor $C_1$, and an inductor $L_1$. The capacitor $C_1$ is between ground and a terminal that inter-connects the series resistors $R_1$ and $R_2$. This second-order circuit allows for more phase shift in the cancellation circuits. This might be required when the SAW phase shift is too small.

The component values for the image cancellation circuits 212a and 212b are selected so as to reduce the image frequency at 1132 MHz. However, those skilled in the arts will recognize that other component values could be selected based on the image frequency that is desired to be canceled. Furthermore, other component values could also be used based on the attenuation at the image frequency of the SAW filter 114. Still further, other network configurations could also be used to generate a signal that is approximately 180 degrees out-of-phase with the image channel frequency, but that has an amplitude that is approximately equal to the attenuation of the SAW filter 114 at the image channel frequency. These other networks are within the scope and spirit of the present invention.

As shown, the feed forward image cancellation circuit 212 is disposed external to the substrate of the tuner 402, so that discrete coils and other components can be used to realize the attenuator and phase shifter networks. However, on-chip configurations could also be utilized as will be understood by those skilled in the arts based on the discussion given herein.

Figure 7:
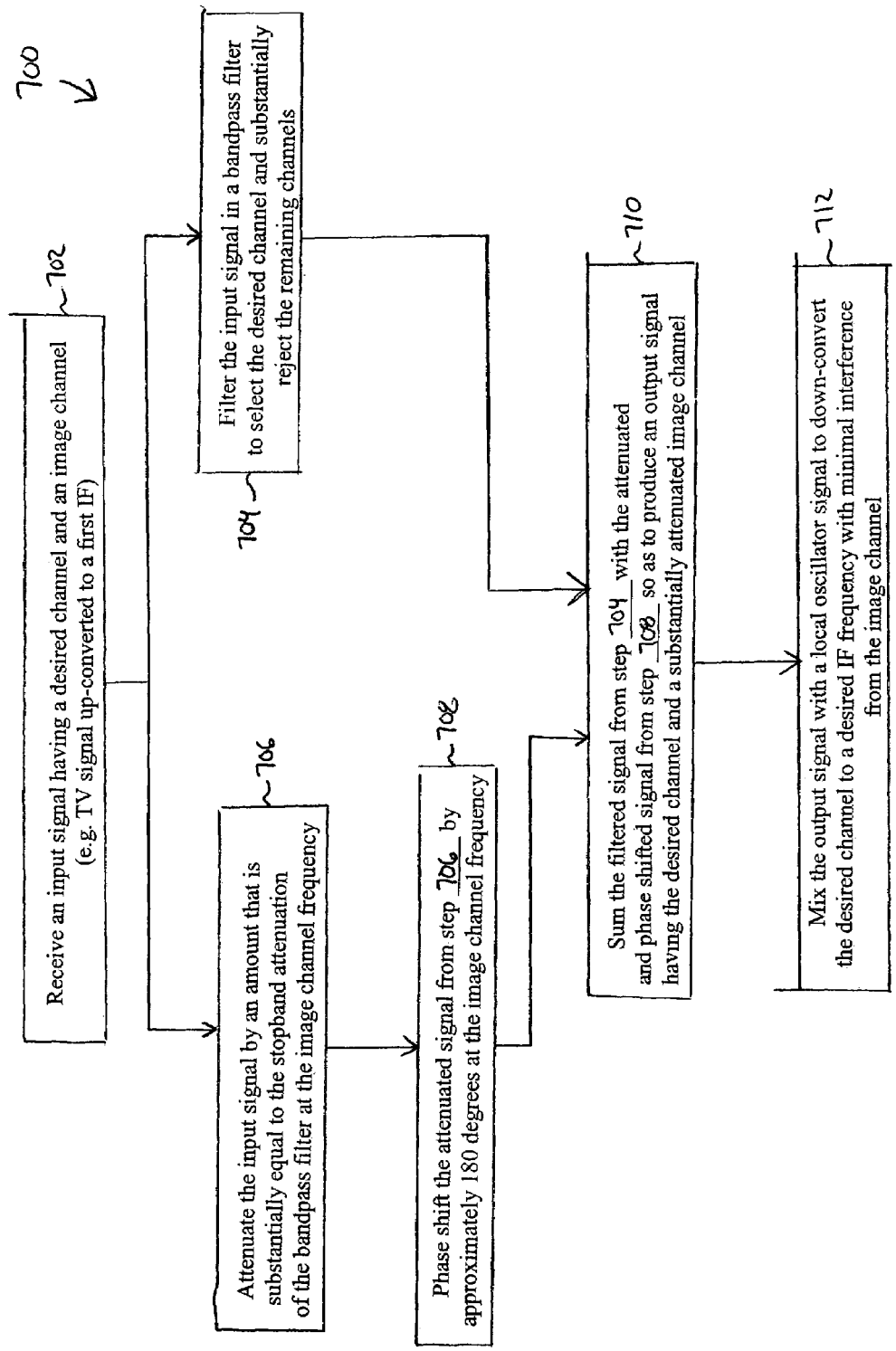
FIG. 7 illustrates a flowchart that further describes the operation of reducing the amplitude of an image channel frequency in a receiver having a bandpass filter for channel selection, according to embodiments of the present invention.

FIG. 7 illustrates a flowchart 700 that further describes the operation of reducing the amplitude of an image channel frequency in a receiver having a bandpass filter for channel selection.

In step 702, an input signal is received having a desired channel and an image channel. For example, in FIG. 4, the IF signal 111 includes a desired channel and an image channel. As discussed above, the image channel occurs at $IF_1-2 \cdot IF_2$ for a dual conversion tuner.

In step 704, the input signal is filtered in a bandpass filter so as to select the desired channel, and substantially attenuate the remaining channels or frequencies. The resulting filtered signal includes the desired channel and an attenuated image channel, the image channel attenuation determined by the stopband attenuation of the bandpass filter at image channel frequency.

Steps 706 and 708 operate in parallel with step 704 so as to generate an image cancellation signal having an image channel that has an equal amplitude with the image channel output of step 704, but is 180 degrees out-of-phase. In step 706, the input signal is attenuated by an amount substantially equal to the stopband attenuation of the bandpass filter at the image channel frequency. In step 708, the attenuated signal from step 708 is phase shifted by 180 degrees at the image channel frequency.

In step 710, the attenuated and phase-shifted signal from step 708 is combined with the filtered signal to produce an output signal having a desired channel and a substantially attenuated image channel frequency.

In step 712, the output signal is mixed with a local oscillator signal to down-convert the desired channel to a desired IF frequency. For instance, the output of the SAW filter 114 is mixed with the LO 124 to provide the second IF 127 in FIG. 4. Since the image channel was substantially attenuated by steps 706-710, then the image channel does not interfere with the desired channel at the down-converted frequency.

Figure 9A:
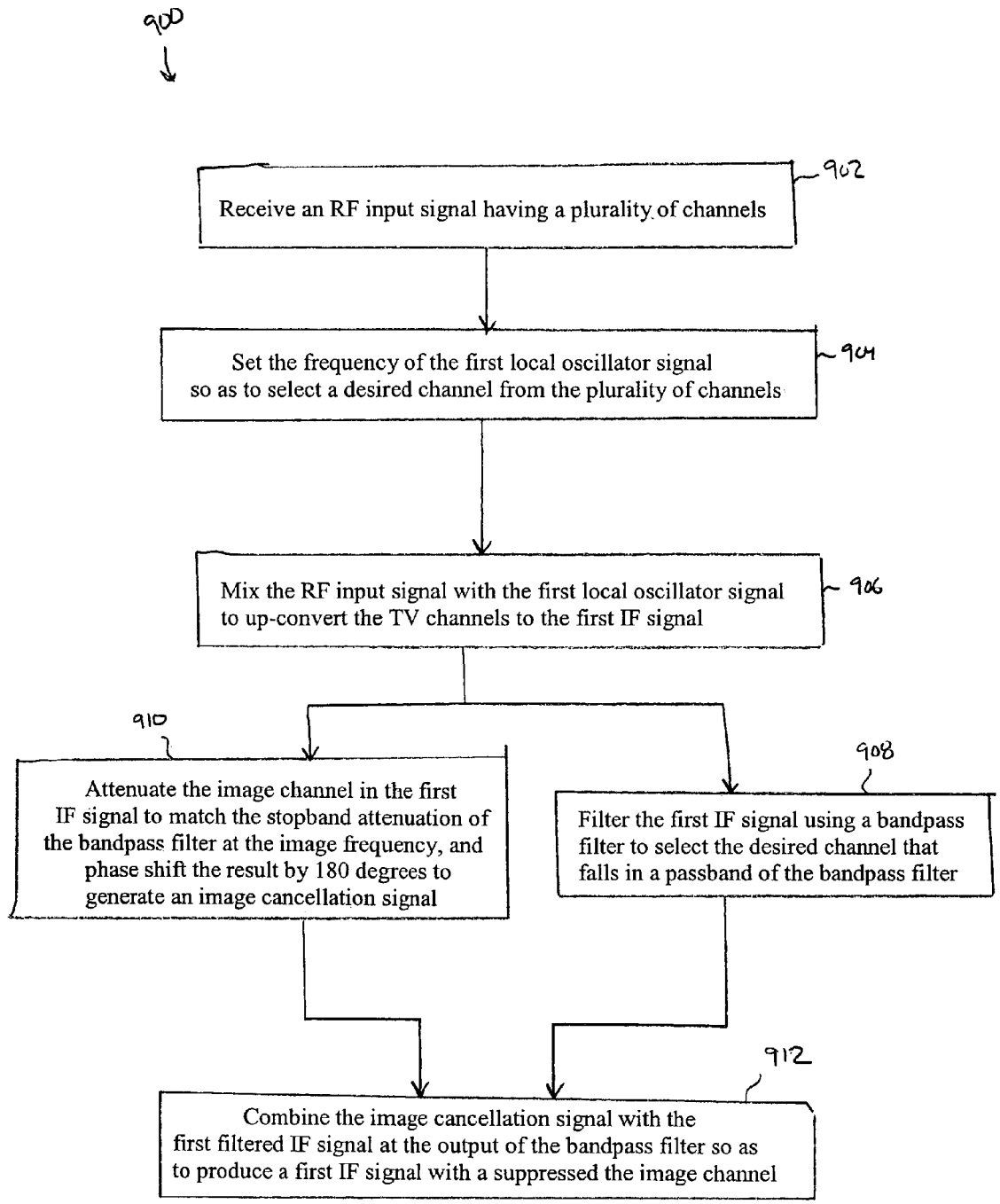

FIG. 9 illustrates a flowchart 900 that further describes the feed forward image rejection in the dual conversion tuner assembly 400, according to embodiments of the present invention.

In step 902, an RF input signal 107 is received having a plurality of channels. For instance the RF input signal 107 can include multiple TV channels having 6 MHz channel spacings as discussed above.

In step 904, the frequency of the first local oscillator signal is selected so as to up-convert a desired channel into the passband of the SAW filter 114. For instance, the frequency of the PLL 110 is tunable from 1270-2080 MHz so as to up-convert the desired channel to approximately 1220 MHz, which is the center of the passband of the SAW filter 114.

In the 906, the mixer 108 mixes the RF input signal 107 with the first local oscillator 109 so as to generate a first IF signal 111. As discussed in step 904, the LO signal 109 is selected so that desired channel is up-converted to the center of the passband of the SAW filter 114 by the mixer 108. The IF signal 111 substantially includes the entire spectrum of TV channels in the RF input signal 107, and therefore IF signal 111 also includes an image channel that can interfere with the desired channel if it is not attenuated.

In step 908, the SAW filter 114 filters the first IF signal 111 to select the desired channel that falls within the passband of the SAW filter 114, and substantially rejects the remaining channels. Although, the image channel is substantially rejected by the SAW filter 114, some finite energy still appears at the image channel frequency in the filtered first IF signal 115. In the dual conversion tuner 400, the image channel frequency occurs at $IF_1-2 \cdot IF_2$, which occurs at 1132 MHz for a 1220 MHz $IF_1$ and a 44 MHz $IF_2$.

In step 910, the feed forward image cancellation circuit 212 attenuates the image channel to match the stopband rejection of the SAW filter 114, and phase shifts the result by 180 degrees, to generate an image cancellation signal 205. At the image channel frequency, the image cancellation signal 205 has an amplitude that is substantially equal to that at the output of the SAW filter 114, but is 180 degrees out-of-phase.

In step 912, the filtered first IF signal 115 at the output of the SAW filter 114 is combined with the image cancellation signal 205 to generate a first IF signal 207. The first IF signal 207 has a substantially suppressed image channel compared to the image channel compression at the output of the SAW filter 114.

In step 914, the second mixer 118 mixes the first IF signal 207 with the second LO 124 to down-convert the first IF signal 207 to a second IF 127. The second LO 124 is determined so that the desired channel in the first IF signal 207 is down-converted to the desired second IF frequency. Since the image channel has been substantially reduced in the first IF signal 207, then the image channel does not substantially interfere with the desired channel in the second IF 127.

In step 916, the SAW filter 130 filters the second IF signal 128 to remove any unwanted frequencies and pass the desired channel in the output IF signal 133.

The invention herein has been described in reference to a dual conversion tuner for the down-conversion and processing of television signals. However, the invention is not limited to this example embodiment, and could be implemented in any receiver. More specifically, the invention could be implemented in any receiver having a bandpass filter for channel selection that utilizes subsequent frequency mixing.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A method of image channel suppression in a receiver having a bandpass filter coupled to an input of a mixer, the bandpass filter having a passband that passes a desired channel and a stopband attenuation at an image channel, the method comprising:
  receiving an input signal having the desired channel and the image channel;
  filtering the input signal in the bandpass filter to produce a filtered signal;
  attenuating the input signal, including the desired channel and the image channel, by the stophand attenuation of the bandpass filter to provide an attenuated signal;
  phase shifting the attenuated signal by approximately 180 degrees at the image channel to produce an image cancellation signal; and
  combining the filtered signal with the image cancellation signal to produce an output signal, to suppress the image channel in the output signal.

2. The method of claim 1, wherein the desired channel in the input signal occurs at a first hF frequency (IF1), further comprising the step of:
  mixing the output signal of the combining step with a local oscillator signal to down-convert the desired channel to a second IF frequency (IF2).

3. The method of claim 2, wherein the image channel in the input signal occurs at an approximate frequency of (IF1-2·IF2).

4. The method of claim 3, further comprising the step of:
  filtering the desired channel at IF2 using a second bandpass filter.

5. The method of claim 1, wherein the bandpass filter is a SAW filter.

6. The method of claim 1, wherein the steps of attenuating and phase shifting are performed in parallel with the filtering step.

7. The method of claim 1, wherein the desired channel in the input signal occurs at an RF frequency (RF), further comprising the step of:
  mixing the output signal of the combining step with a local oscillator signal to down-convert the desired channel from the RF frequency to an IF frequency (IF), wherein the image channel occurs at an approximate frequency of (RF-2·IF).

8. A method of image channel suppression in a dual conversion receiver having a first mixer, a bandpass filter coupled to an output of the first mixer, and a second mixer coupled to the output of the bandpass filter, the method comprising:
  receiving an RF input signal having a plurality of channels;
  up-converting the RF input signal to generate a first If signal;
  filtering the first If signal in the bandpass filter to select a desired channel from the plurality of channels that falls in a passband of the bandpass filter, so as to produce a filtered first If signal having the desired channel and an image channel that is attenuated by a stopband attenuation of the bandpass filter;
  generating an image cancellation signal from the first If signal, the image cancellation signal having an amplitude at the frequencies of the desired channel and image channel substantially equal to the amplitude of the image channel in the first filtered If signal and a phase that is offset by approximately 180 degrees from the image channel in the first filtered If signal; and
  combining the filtered first IF signal with the image cancellation signal;
  down-converting the result of the combining step to a second IF signal having the desired channel.

9. The method of claim 8, further comprising the step of filtering the second IF signal.

10. The method of claim 8, wherein the step of generating the image cancellation signal from the first IF signal includes the steps of:
  attenuating the first IF signal by an amount approximately equal to the stopband attenuation of the bandpass filter at the image channel frequency; and
  phase shifting the result of the attenuating step so that the image cancellation signal is 180 degrees out-of-phase with the filtered first IF signal at the image channel frequency.

11. The method of claim 8, wherein the generating step is performed in parallel with the filtering step.

12. The method of claim 8, wherein the up-converting step includes the step of:
  mixing the RF input signal with a first local oscillator signal having a frequency determined to shift the desired channel to the passband of the bandpass filter.

13. The method of claim 12, wherein the down-converting step includes the step of mixing the result of the combining step with a second local oscillator signal to generate the second IF signal.

14. A receiver portion for suppressing an image channel, comprising:
  a bandpass filter having a passband determined to pass a desired channel and attenuate an image channel of said desired channel; and
  an image cancellation circuit coupled across input and output terminals of said bandpass filter, including
    an attenuator having an attenuation at said desired channel and said image channel both determined by an attenuation of said image channel at an output of said bandpass filter, and
    a phase shifter coupled to said attenuator that provides a phase shift of approximately 180 degrees at the image channel frequency.

15. The receiver portion of claim 14, wherein said bandpass filter is a SAW filter.

16. The receiver portion of claim 14, wherein:
  said attenuator includes at least one resistor connected between said input and output terminals of said bandpass filter; and
  said phase shifter includes at least one capacitor coupled between ground and a terminal of said at least one resistor.

17. The receiver portion of claim 14, wherein said attenuator includes first and second resistors coupled in series with each other and in parallel with said bandpass filter.

18. The receiver portion of claim 17, wherein said phase shifter includes a capacitor between ground and a terminal connection between said first and second resistors.

19. The receiver portion of claim 14, wherein an attenuator input is coupled to said input of said bandpass filter, a phase shifter input is coupled to an output of said attenuator, and an attenuator output is coupled to an output of said bandpass filter.

20. A dual conversion receiver, comprising:
  a receiver input configured to receive an RF input signal having a plurality of channels;
  a first mixer having a first input coupled to said receiver input and a second input coupled to a first local oscillator signal, said first mixer outputting a desired channel of said plurality of channels at a first IF frequency (IF1);
  a bandpass filter, having an input coupled to an IF output of said first mixer, and having a passband centered at IF1 that passes said desired channel and attenuates an image channel of said desired channel; and a second mixer having a first input coupled to an output of the bandpass filter and a second input coupled to a second local oscillator signal, said second mixer outputting said desired channel at a second IF frequency (IF2); and an image cancellation circuit, coupled in parallel with said bandpass filter, having a passband response at said image channel and said desired channel that is substantially equal in amplitude and opposite in phase of a response of said bandpass filter at said image channel.

21. The dual conversion receiver of claim 20, wherein said image channel occurs at a frequency of approximately (IF1-2·IF2).

22. The dual conversion receiver of claim 20, wherein said image channel falls outside said passband of said bandpass filter.

23. The dual receiver of claim 21, wherein said image cancellation circuit includes:

an attenuator having an attenuation that approximately matches an attenuation of said bandpass filter at said image channel and said desired channel; and a phase shifter that phase shifts an output of said attenuator by approximately 180 degrees.

24. The dual conversion receiver of claim 20, wherein said first and second mixers are configured to have differential inputs and outputs.

25. The dual conversion receiver of claim 20, wherein said bandpass filter is a SAW filter.

26. The dual conversion receiver of claim 20, wherein said first and second mixers are disposed on a common substrate and said bandpass filter is external to said common substrate.

* * * * *

UNITED STATES PATENT AND TRADEMARK OFFICE
CERTIFICATE OF CORRECTION

| | | |
|---|---|---|
| PATENT NO. | : 7,362,384 B2 | Page 1 of 1 |
| APPLICATION NO. | : 10/812949 | |
| DATED | : April 22, 2008 | |
| INVENTOR(S) | : Dauphinee et al. | |

It is certified that error appears in the above-identified patent and that said Letters Patent is hereby corrected as shown below:

In Claim 2, column 9, line 18, "the input signal occurs at a first hF frequency (IF1)" should read --the input signal occurs at a first IF frequency (IF1)--.

In Claim 8, column 9, line 49, "up-converting the RF input signal to generate a first If signal" should read --up-converting the RF input signal to generate a first IF signal--.

In Claim 8, column 9, line 51, "filtering the first If signal in the bandpass filter to select a desired channel" should read --filtering the first IF signal in the bandpass filter to select a desired channel--.

In Claim 8, column 9, line 54, "first IF signal having the desired channel and an" should read --first IF signal having the desired channel and an--.

In Claim 8, column 9, line 57, "generating an image cancellation signal from the first If signal" should read --generating an image cancellation signal from the first IF signal--.

In Claim 8, column 9, line 61, "the image channel in the first filtered If signal and a" should read --the image channel in the first filtered IF signal and a--.

In Claim 8, column 9, line 63, "the image channel in the first filtered If signal" should read --the image channel in the first filtered IF signal--.

Signed and Sealed this

Twenty-ninth Day of July, 2008

JON W. DUDAS
*Director of the United States Patent and Trademark Office*